United States Patent [19]

Sword, Jr.

[11] Patent Number: 4,493,065
[45] Date of Patent: Jan. 8, 1985

[54] WEB POSITION INDICATOR

[76] Inventor: Edward L. Sword, Jr., 2912 Chimney Rock La., Louisville, Ky.

[21] Appl. No.: 381,916

[22] Filed: May 24, 1982

[51] Int. Cl.³ .............................................. G01S 15/88
[52] U.S. Cl. ..................................... 367/96; 101/228; 226/11; 340/675; 367/108
[58] Field of Search ........................... 367/93, 96, 108; 226/11; 340/675, 676; 101/226, 227, 228

[56] References Cited

U.S. PATENT DOCUMENTS

| | | | |
|---|---|---|---|
| 3,588,795 | 6/1971 | Linardos et al. | 367/108 |
| 3,733,582 | 5/1973 | Eck et al. | 367/108 |
| 3,928,844 | 12/1975 | Meihofer | 340/675 |
| 4,121,094 | 10/1978 | DiVito et al. | 367/96 |
| 4,122,429 | 10/1978 | Hatai | 367/108 |

OTHER PUBLICATIONS

Schall et al., IBM Tech. Disclosure Bulletin, vol. 24, No. 7B, Dec. 1981, pp. 3590, 3591.

Primary Examiner—Richard A. Farley
Attorney, Agent, or Firm—Edward M. Steutermann

[57] ABSTRACT

Method and apparatus for web break detection employing a sonic signal generator to generate regularly repetitive sonic signals of selected frequency, duration and time spacing between signals and disposed to direct the sonic signals toward a moving web of selected material so the signals are reflected from the web, a receiver device to receive the reflected signals, a time signal generating device to generate signal pulses during the time period between the generation of a sonic signal and receipt of the reflected signal a counter device to count the time generated between the transmission of the sonic signal and the reflected signal so that the number of time signals generated is indicative of the presence of the web as well as the distance of the web from the signal generator and receiver and a logic system to actuate a cutter mechanism to cut the web if it should fall outside a preselected "window" in which the web is positioned.

8 Claims, 4 Drawing Figures

WEB POSITION INDICATOR

BACKGROUND OF THE INVENTION

The present invention relates principally to a method and apparatus for use in association with a printing press or other web processing equipment where upon a break in the web it is necessary to effect a rapid shut-down of the equipment.

Web processing equipment is commonly utilized in a variety of industries to, for example print or otherwise process paper, fabric, plastic film or foil and the like. In such applications the web is moved continuously through the equipment at high rates of speed from the input to the output of the equipment so that in the event of a break in the web it is necessary to stop the equipment, or at least the web feed to the equipment, at the earliest possible time. Rapid response to a web break is necessary to prevent excessive loss of web material since material in the equipment at the time of the break and material fed to the equipment immediately after the web break is unusable. Also continued operation of the equipment after a break can damage the equipment and cause excessive downtime to cleanup, repair equipment and remove the unusable web from the equipment.

The prior art teaches various types of web sensing equipment to detect web breakage and thus the absence of the web material.

Such prior art devices include mechanical arrangements which may include pivotal rollers with connectors to actuate alarm devices and/or a web cutting knife in the event of a break in the web.

Other prior art arrangements have included photoelectric devices where a beam of light, either visible or infrared, is directed transversely across the web path to a photosensitive cell so that when the web is in place the cell does not "see" the light beam and when the web breaks the cell is exposed to the light beam to initiate corrective action. The infrared device can also operate in such a way that the beam is reflected off of the web back to a receiver contained in the transmitter package. When the web is in place the receiver receives a reflected signal. When the web breaks the receiver, loses the signal, and corrective action is initiated.

It has been found that such infrared devices, however, in many such applications, and particularly in printing applications, the web processing generates a heavy dust load and in many situations ink mist is heavy in areas surrounding the equipment. Therefore the environment in which these prior art devices have operated have tended to diminish the effectiveness of the devices because the source and receiver have become coated with dust and/or ink so that the devices in many instances do not function properly.

Also these prior art devices can only detect the presence or absence of a web and therefore can not detect an excessive slack in the material being processed. In the operation of, for example, a printing press, this slack in the web material could cause a wrap-up and thus damage the equipment.

In operation many prior art devices have either stopped the operation of the web drive machine, sounded an alarm, or cut the web of the infeed inresponse to a detected break in the web.

One prior art arrangement utilizing web break detectors is shown in U.S. Pat. No. 3,928,844-Melhofer where a web break detector system unlike that in the present invention is illustrated wherein numerous such devices are utilized in co-operative relation to detect the disappearance of a web from a station.

Another arrangement is shown in U.S. Pat. No. 4,078,487-McComb.

No prior art device is known which utilizes an ultrasonic sound generating source and receiving source to receive a reflected ultra-sonic signal in order to detect a web break and/or excessive slack in a web processing device.

SUMMARY OF THE INVENTION

The present invention provides a new, useful and relatively inexpensive means for reliably determining the occurance of a web break or an excessive slack in a web processing device. Specifically, the present invention provides an arrangement which is not susceptible to changes in environmental conditions or more particularly, to the presence of ink mist or dirt in the environment and can operate satisfactorily in such environments because it does not utilize visable or invisable radiation.

Moreover the present invention eliminates the problems inherent in mechanical detecting devices for determining the occurance of a web break and further provides a device which in addition to determining the occurance of a web break can also be utilized to determine excessive slack in a moving web by providing a "window" that the web is positioned in.

More particularly, the present invention provides a method and apparatus for web break detection employing a sonic signal generator to generate regularly repetitive sonic signals of selected frequency, duration and time spacing between signals and disposed to direct the sonic signals toward a moving web of selected material so the signals are reflected from the web, a receiver device to receive the reflected signals, a time signal generating device to generate signal pulses during the time period between the generation of a sonic signal and receipt of the reflected signal a counter device to count the time generated between the transmission of the sonic signal and the reflected signal so that the number of time signals generated is indicative of the presence of the web as well as the distance of the web from the signal generator and receiver and a logic system to actuate a cutter mechanism to cut the web if it should fall outside a preselected "window" in which the web is positioned.

It is to be understood that various other arrangements within the scope of the present invention will occur to those skilled in the art upon reading the disclosure set forth hereinafter however, one example in accordance with the present invention is illustrated in the accompanying figures.

BRIEF DESCRIPTION OF THE DRAWINGS

An example in accordance with the present invention wherein.

DETAILED DESCRIPTION OF THE DRAWINGS

Figure 1:
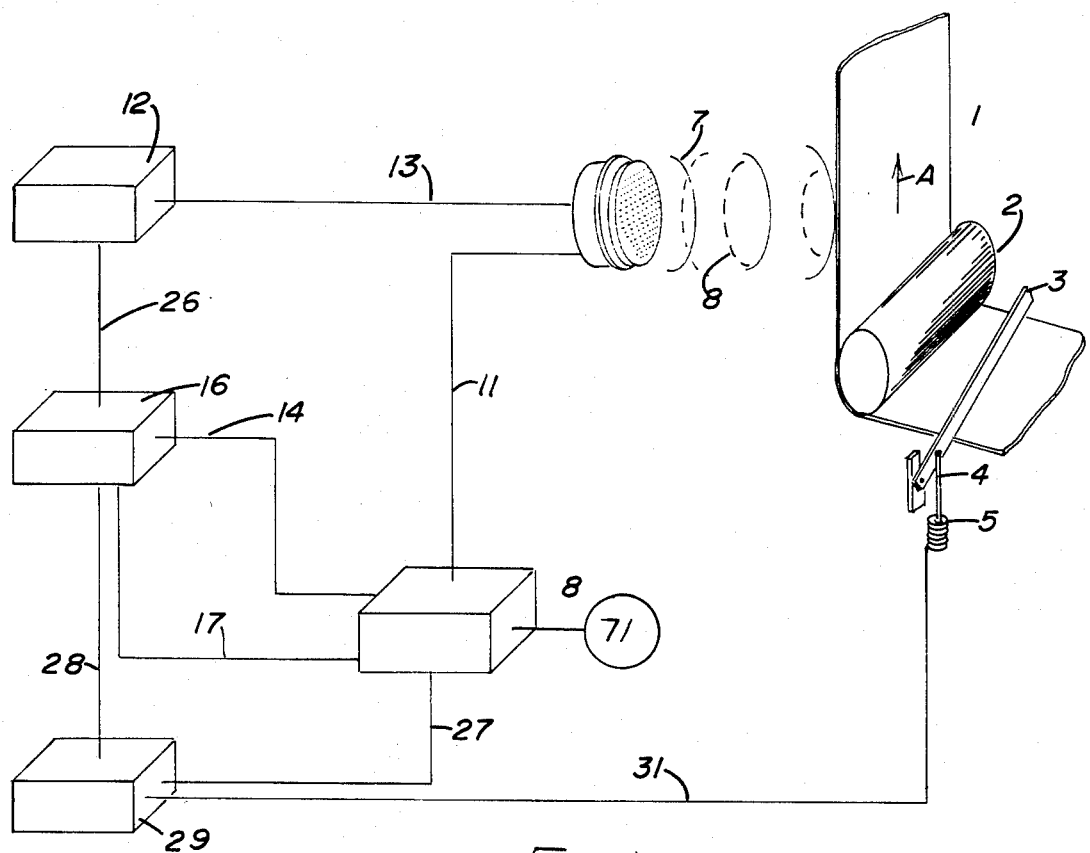
FIG. 1 is a schematic view illustrating the elements of one arrangement within the scope of the present invention.

FIG. 1 is a schematic illustration of an arrangement within the scope of the present invention wherein a web 1 of material, for example of web of material to be printed, is carried in a printing press (not shown) where a roller 2 is shown as illustrated of a section of, for example, a printing press, over which a web 1 travels in a direction shown by arrow A. A cutting knife 3 is provided and shown schematically at a selected location adjacent the printing press, for example, adjacent the infeed. Knife 3 is operated by means of a lever 4 actuated by a coil 5 so that when lever 4 is drawn into coil 5 knife 3 descends and cuts web 1.

In accordance with the present invention a sonic signal generating and detecting device is provided. While various devices can be utilized in the example shown in FIG. 1, a Polaroid TM Ultrasonic Ranging System is provided where a transducer 6 is provided to, as is known in the art, emit a super sonic pulse. An echo is returned from an object displaced a selected distance from transducer 6, for example web 1. In FIG. 1 the emitted signals are shown by the solid lines 7 while the echos are shown by the dotted lines 8.

In one example the emitted pulses 7 are high frequency inaudible pulses lasting for selected periods of time, for example 1 millisecond and each burst can consist of numerous pulses emitted at selected intervals. In the arrangement shown transducer 6 acts as both a speaker and a microphone and the reflected echo signals 8 are received by transducer 6 where after generating the pulse the operating mode of the transducer changes, as described hereinafter, from speaker to microphone to detect the returning echo. Upon receiving the echo the transducer converts the sound energy to a electrical energy which is amplified by an analog circuit 8 as described hereinafter, where the echo signal is transmitted by a connector 11. A power source 12 is provided to generate the initial signal by means of an input 13 to transducer 6. The output from analog circuit 8 is supplied by means of a lead 14 to a digital processor 16, described hereinafter, which also includes a gain and band width control which transmits the the selected gain and band width control by means of a lead 17 to analog circuit 9 for control of the process echo supplied by lead 14. A clock 71, for example a crystal controlled clock is provided to time the operation of the device. In this regard lead 26 is provided from digital section 16 to power supply 12 to time the actuation and deactuation of power supply 12 to supply power through lead 13 to transducer 6. An output 27 is provided from analog circuit 8 and an output 28 is provided from digital section 16 to a digital logic circuit 29 described hereinafter which provides an output 31 to operate coil 5 to selectively actuate knife 3 to cut web 1.

The operation of the device is initiated as previously discussed by the emission and receipt of sonic signals and echos. While various methods can be utilized within the scope of the present invention to initiate the signal and receive the echo in the example shown a Polaroid TM Ultra Sonic Ranging System is utilized. It is not intended that the scope of the invention be limited to the use of such a device but such device is suitable.

Figure 2:
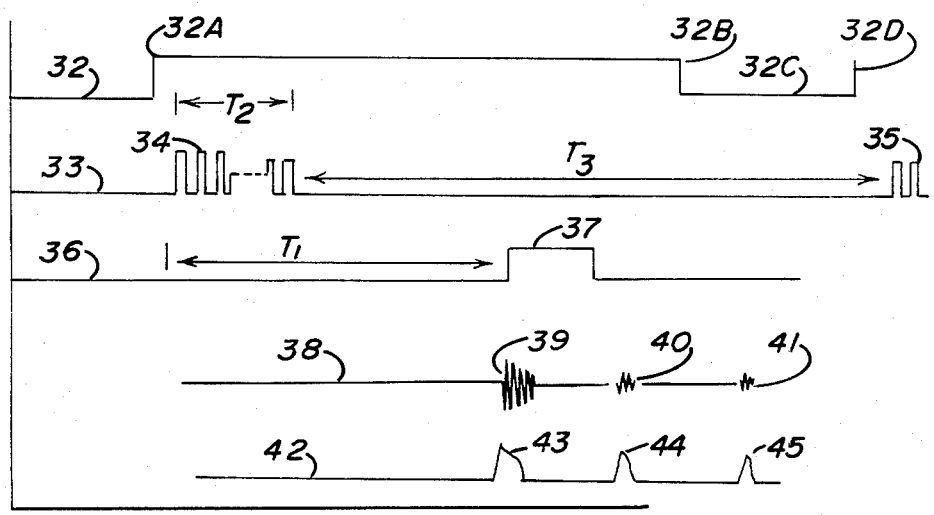
FIG. 2 is an illustration of wave forms utilized in the device shown in FIG. 1.

FIG. 2 is an illustration of the various wave forms and sequences involved in the operation of the device shown in FIG. 1. In FIG. 2 a voltage switch signal 32 is provided as described hereinafter and initiates operation upon generation of a step function 32A where the length of the time period of the voltage switch signal lasts to a point 32B shown in FIG. 2. The voltage switch signal is then turned off for a period 32C and reinitiated at point 32D.

The transmission from transducer 6 is represented by curve 33 where selected frequency signals 34 are generated for a period of time T2 and then subsequently repeated after a time T3 as indicated by signals 35 and described hereinafter. The echo signals are subsequently received by the microphone in transducer 6 as indicated by curve 36 where the first echo signal is shown as curve 37 which occurs in time T1 after the inital emission of the signal 34 where the time T1 is indicative of the distance of the reflective surface, in this case web 1, from the transducer. Curve 38 represents the actual echo signal as received where the signals received are indicated by curves 39, 40 and 41 where curves 40 and 41 are subsequent echos. The signal is processed to form a signal as indicated by curve 42 where the processed signals are indicated by curves 43 and 44 and 45 corresponding to signals 39, 40 and 41. Time T1 is the critical time in the operation of the device as will be described hereinafter as a clock provides multiple counts during this time as an indication of lapsed time where the clock pulses are processed as described hereinafter to determine the distance of the web 1 and more importantly the presence of web 1 in the "window" of the emitted signals 7.

Figure 3:
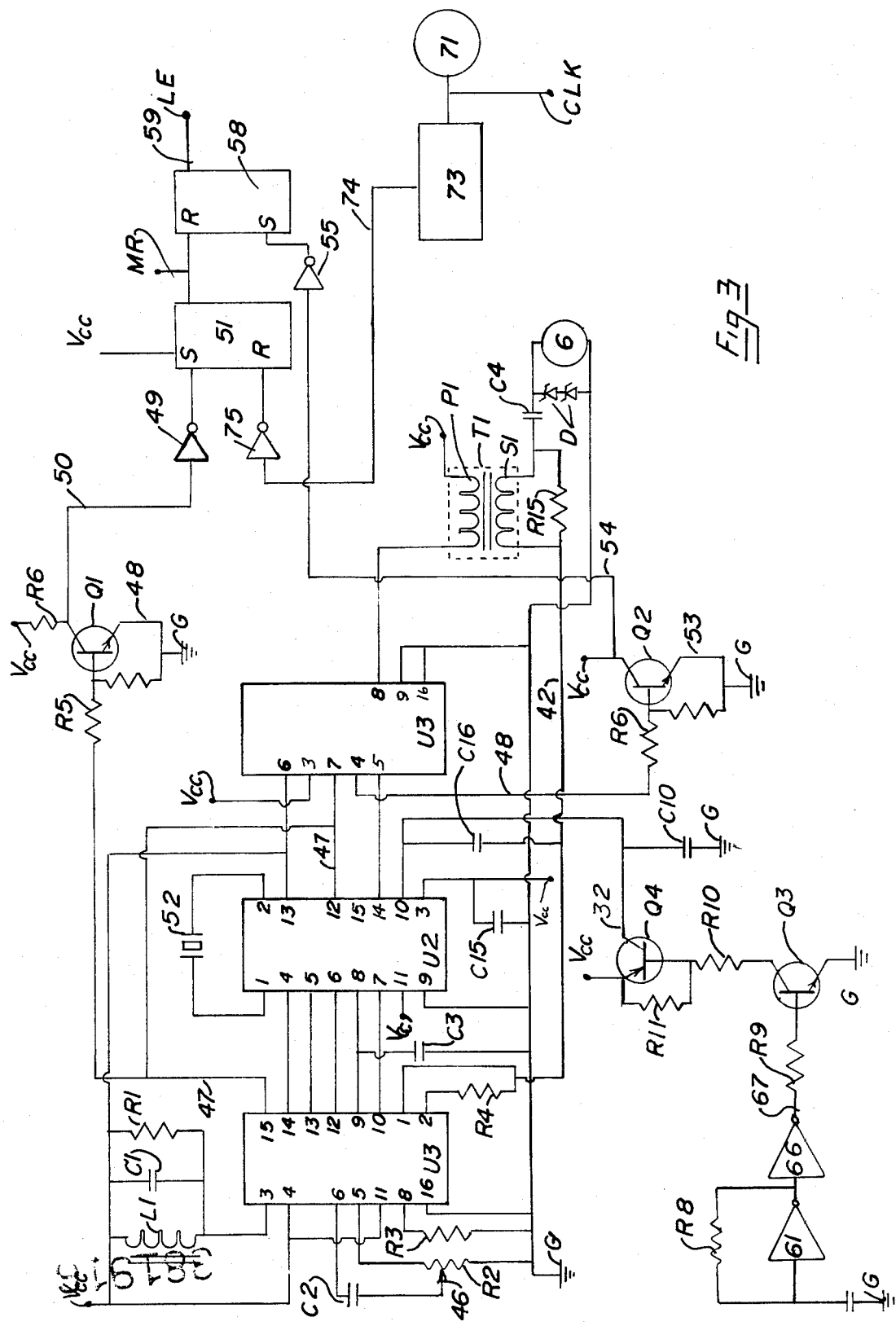
FIG. 3 is a schematic diagram of one example of an apparatus useful to generate signals and receive same to indicate the presence of a web.

FIG. 3 is a schematic diagram of an example of circuitry of the device shown in FIG. 1 except for the digital logic circuit 29 utilized in the present invention.

In FIG. 3 three integrated circuits U1, U2 and U3, manufactured by Texas Instruments, Inc. (which are custom circuits manufactured for Polaroid Corp) are provided. Integrated circuit U1 is an analog processing circuit, the details being the property of Polaroid Corp., and described in publications of the Poloroid Corp. entitled "Ultrasonic Ranging System". In the arrangement shown the voltage supply Vcc is provided to a pin 4 while a capacitance, resistance, and inductance parallel series circuit including inductor L1, capacitor C1, resistor R1 are provided to supply an oscillating signal to input 3. Pin 5 is adapted to provide the amplified echo signal as typically shown in curve 38 of FIG. 2 through a potentiometer resistor R2 where the tap 46 from potentiometer R2 is supplied through a capacitor C2 from pin 6 of integrated circuit U1.

The gain of the echo signal transmitted from integrated circuit U1 is adjusted by the setting of potentiometer R2 where the output is connected to ground G. Pin 11 of integrated circuit U1 is connected to supply voltage Vcc as shown. Pin 8 of integrated circuit U1 is supplied through resistor R3 to ground where resistor R3 in conjunction with resistor R2 also offsets the gain of the echo signal. Integrated circuit U1 is grounded at pin 16. The processed echo signal 42 as reflected in FIG. 2 is supplied from pin 9 of integrated circuit U1 while pins 12, 13 and 14 of integrated circuit U1 are connected to integrated circuit U2, a digital circuit and more particularly to pins 4, 5 and 6 respectively of integrated circuit U2 to control gain of the process signals.

Likewise pin 2 of integrated circuit U1 is connected through resistor R4 to the echo signal path 52 as described hereinafter and to pin 1 of integrated circuit U1. Pin 15 of integrated circuit U1 supplies a transmission signal 47 to generate a set signal for latch means described hereinafter where signal 47 is provided through resistor R5 to the base of transistor Q1 where its emitter 48 is grounded at G. Voltage source Vcc is connected through a resistor R6 to the collector of transistor Q1 and a signal 50 which actually is the set signal is supplied through an inverter 49 to a set-reset latch 51.

With respect to circuit U2 a ceramic oscillator 52 is provided and connected between pins 1 and 2 to provide a base frequency for the generation of the transmission signals. Supply voltage Vcc is provided to pin 8 of circuit U2 and ground is provided by means of pin 9.

The signal 47 is supplied to pin 12 of integrated circuit U2 and likewise at pin 7 of an interfacing integrating circuit U3 as described hereinafter. The voltage Vcc is supplied at pin 3 to integrated circuit U2, the processed echo signal is provided at pin 15 of integrated circuit U2 and at pin 4 of interface circuit U3 to indicate an echo signal has been received. Integrated circuit U3 is a current sourcing device for a transformer described hereinafter to supply high voltage high current signals for the generation of the transmission signals. In this regard pin 8 of integrate circuit U3 is supplied to supply voltage Vcc through a transformer T1 specifically through the primary coil P1 where the secondary coil S1 is disposed to increase the voltage and current of the signal to approximately 300 volts and 2.5 amp maximum to provide a surge current through a capacitor C4 to generate the sonic frequency signals. The return 42 from transducer 6 is supplied to input 1 and 2 of integrated circuit U1 for return of the echo signal when received by the transducer signal 6. The signal produced at pins 15 of integrated circuit U2 and 4 of integrated circuit U3 is supplied through a resistor R6 to the base of a transistor Q2 with its emitter 53 grounded at G and the collector connected to supply voltage Vcc so the detected echo signal 54 can be supplied through an inverter 55 to set-reset latch, for example part 4044, and indicated by numeral 58. The signal from output 54 is supplied through inverter 55 to the set output of latch 58. The cooperative latches 51 and 58 are provided to supply a latch enable signal 59 as will be understood in the art upon the occurance of the transmission of a audible signal as shown in FIG. 2 and a master reset signal MR is supplied between latches 51, 58 to initiate operation of the converting mechanism described hereinafter.

With respect to the voltage switching signal, the voltage switching signal is supplied to pin 10 of integrated circuit U2.

While various means can be utilized to generate the voltage switching signal in the arrangement shown in FIG. 3 a symmetrical drive is shown which is suitable, for example, for generating 1 to 5 repetitions per second. The device includes series Schmitt Triggers, for example 74C14 devices designated by numerals 61 and 62 where a gain circuit including a resistor R8 is shown around Schmitt Trigger 61. The output 67 from trigger 66 is supplied through a resistor R9 to the base of a transistor Q3. The emitter of transistor Q3 is grounded and the collector is connected through a resistor R10 to the base of a second transistor Q4, where a NPN transistor where the emitter is connected to source voltage Vcc with a bypass resistor R11 and the collector is connected to pin 10 of integrated circuit U2 and grounded through a capacitor C10. The output 69 of transistor Q4 collector provides the voltage switching signal shown by curve 32 in FIG. 2.

A clock 71 is provided to supply a clock signal Clk and to supply the same clock signal to a 3 digit BCD counter 73 which supplies an output reset signal 74 through an inverter 75 to the reset input of latch 51. The latch enable signal 59 is supplied from latch 58. A second clock output Clk is also provided.

In operation of the device described hereinafter the clock pulses from output Clk are counted during the time interval T1 as an indication first of the presence of web 1 and secondly the distance of web 1 and whether the web is within a "window".

Figure 4:
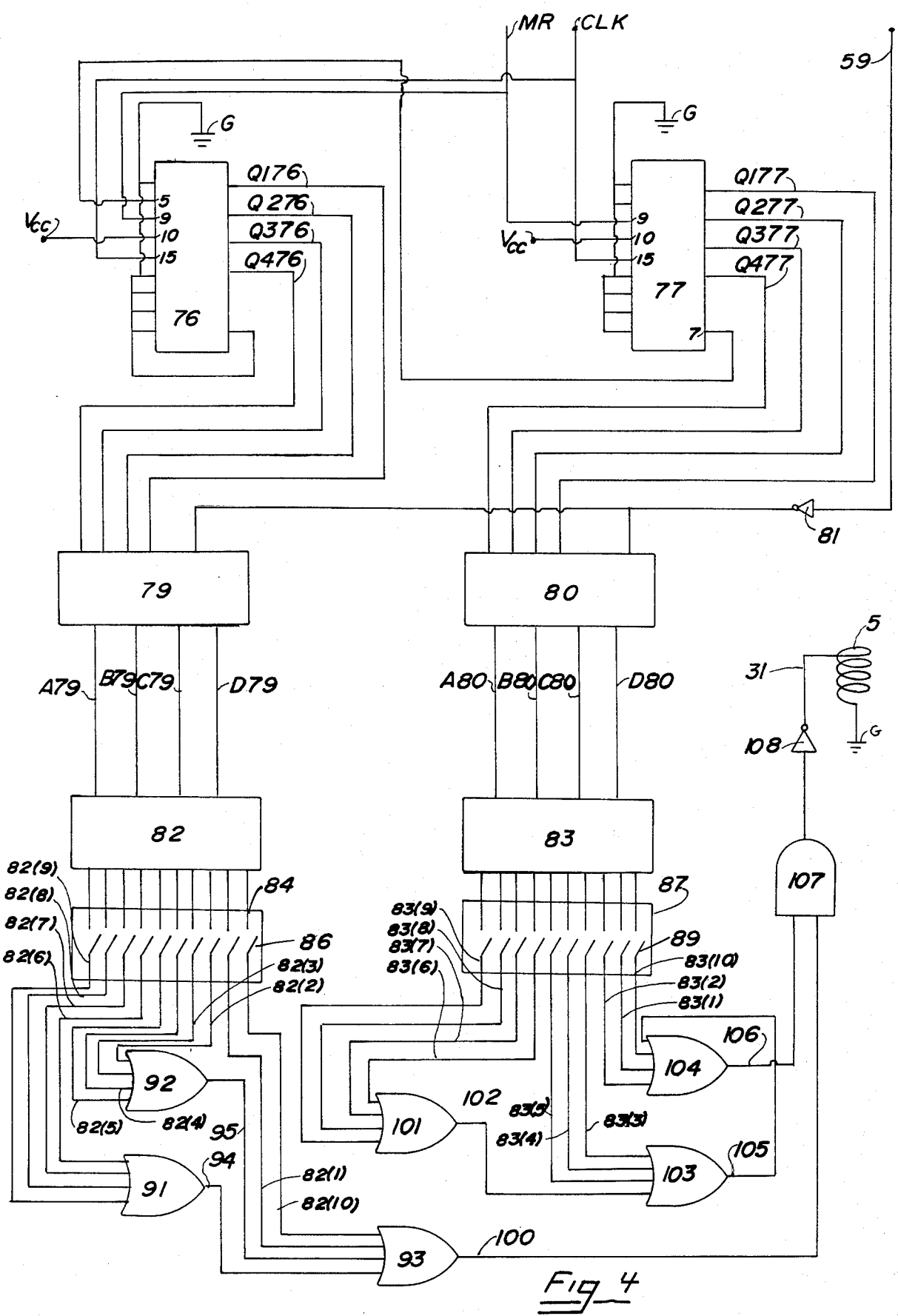
FIG. 4 is a schematic diagram of a logic circuit useful in accordance with the present invention.

The logic circuit for accomplishing this objective is illustrated in FIG. 4.

In FIG. 4 a pair of BCD up/down counters 76, 77 are provided and can, for example, be Motorola Part 14510B where the clock signal Clk is supplied to the clock input pin 15 of each counter. Supply voltage Vcc is supplied to pin 10 the up/down pin to determine the direction of counting. The master reset signal MR is supplied in each case to pin 9. The carryout pin 7 of counter 77 is supplied to the carry in pin 5 of counter 76. The outputs Q176–Q476 are supplied from counter 76 to a dual four bit latch 79, for example Motorola Part MC14508B. The outputs Q177–Q477 of counter 77 are likewise supplied to a four bit latch 80 similar to latch 79. The latch enable signal 59 is supplied through an inverter 81 to both latches so that when the latches receive the latch enable signal the data is updated and stored in the dual four bit latch 79 and 80. In this regard it will be noted that the BCD units and output from the four bit dual latch 79 are supplied to a tenths decoder 83 and units decoder 82. The decoders provide decimal outputs to a tenths multiple selective switch 88 and a units multiple selective switch 85 which are manually opened or closed to set the width of the "window" the web is positioned in. (all unused switch outputs can be grounded). In this regard it will be noted that counter 77 counts tenths of transmissions while counters 76 with the carryover counts units. Thus the latch 79 transmits tenths of units while latch 80 transmits units. Outputs 82(6) to 82(9) which numerals designate the units output digits are supplied to a quad input OR gate 91 while the terminals 82(2)–82(5) are supplied to a second quad input OR gate 92. The output 82(1) and 82(10) are supplied to an OR gate 93 along with outputs 94 from OR gate 91 and 95 from OR gate 92. Thus so long as any of the switches 86 is closed and a corresponding input signal is received the output 100 from OR gate 93 will be high. A similar situation applies with respect to the output from switch 88 where outputs 83(6)–83(9) are supplied to an OR gate 101 having an output 102 while the outputs 83(3)–83(5) are supplied to an OR gate 103 along with the output 102 from OR gate 101. The outputs 83(2)–83(1) and 83(10) are supplied to an OR gate 104 which also receives output 105 from OR gate 103 and provides an output 106. Again by proper selection of the switches 85 and 88 the permissable range of tenths and units digits can be selected to determine the appropriate window for the location of the web 1. In summary, so long as the proper configuration of reflections is received by transducer 6 and the timing generated by the clock input signal is proper so that the selected range of outputs selected at switches 85 and 88 is achieved outputs 106 and 100 from OR gates 104 and 93 will both be high and are supplied to an AND gate 107 which supplies the high signal to an inverter 108 to maintain a powerdown situation on the output 31 which is supplied to coil 5 so that knife 3 stays in the noncutting position. If either the units or tens output fall outside the permissable range the output from AND gate 107 goes low energizing coil 5 through inverter 108 and causing knife 3 to sever the web.

It will be understood that the foregoing is but one example of an arrangement within the scope of the present invention and that various other arrangements also within the scope of the present invention will occur to those skilled in the art upon reading the disclosure set forth hereinbefore.

I claim:

1. Apparatus for detection of a planar web within a selected space between first and second distances from a sonic signal generator where said sonic generator generates regularly repetitive ultra sonic signals of selected frequency, duration, and time spacing between signals and is disposed to direct said sonic signals toward said web so the signals are reflected from said web as reflected signals; signal receiver means to receive said reflected signals, time signal generating means to generate signal pulses during the time period between the generation of said ultra sonic signal and receipt of said reflected signals; counter means to receive said signal pulses and count said signal pulses during the time interval between the transmission of said ultra sonic signal and said reflected signal and provide said counted pulses as a binary number signal at counter output means indicative of the distance of said web from said signal generator; binary to decimal converter means having binary coded decimal number input and decimal outputs to receive said binary number signal and provide a decimal output; switch means provided at at least one of said decimal outputs to be selectively opened or closed to permit transmission of signals provided at said decimal output so the presence of said web within said selected space from said generator is reflected by signals at selected decimal outputs.

2. The invention of claim 1 wherein said counter means includes first counter means to receive a first decade of pulses and provide said first decade of pulses as a binary number at first counter output means, carry-over means to carry said pulses in excess of said first decade of said first decade of pulses as a binary number at second counter output means.

3. The invention of claim 1 including logic means to receive said decimal outputs and having logic output means to provide a first signal in response actuation of selected decimal output means by presence of said web within said selected space and second signal in response to deactivation of selected decimal outputs by absence of said web within said selected space.

4. The invention of claim 3 wherein 10 decimal outputs are provided from each binary to decimal converter means and wherein said logic means includes "OR" logic gates to receive at least two of said decimal outputs to provide said first and second signals at the output thereof.

5. The invention of claim 4 wherein said logic means includes at least two "OR" gates each connected to receive selected decimal outputs at the inputs thereof and provide said first and second output signals to a third "OR" logic gate to receive output signals from said first and second "OR" logic gate to provide said first and second signals responsive to the output signals from said first and second "OR" gates.

6. The invention of claim 3 wherein said logic output means provides said first signal when said object is within a selected distance range from said ultra sonic generator and provides said second signal when said object is outside said selected distance range.

7. The invention of claim 1 wherein said selected material is paper in process in a printing press.

8. The invention of claim 7 including knife means actuated by said second signal to cut said web.

* * * * *